Dec. 18, 1923.
C. DE LA BARRE
1,477,653
CULINARY STIRRING DEVICE
Filed Jan. 8, 1923
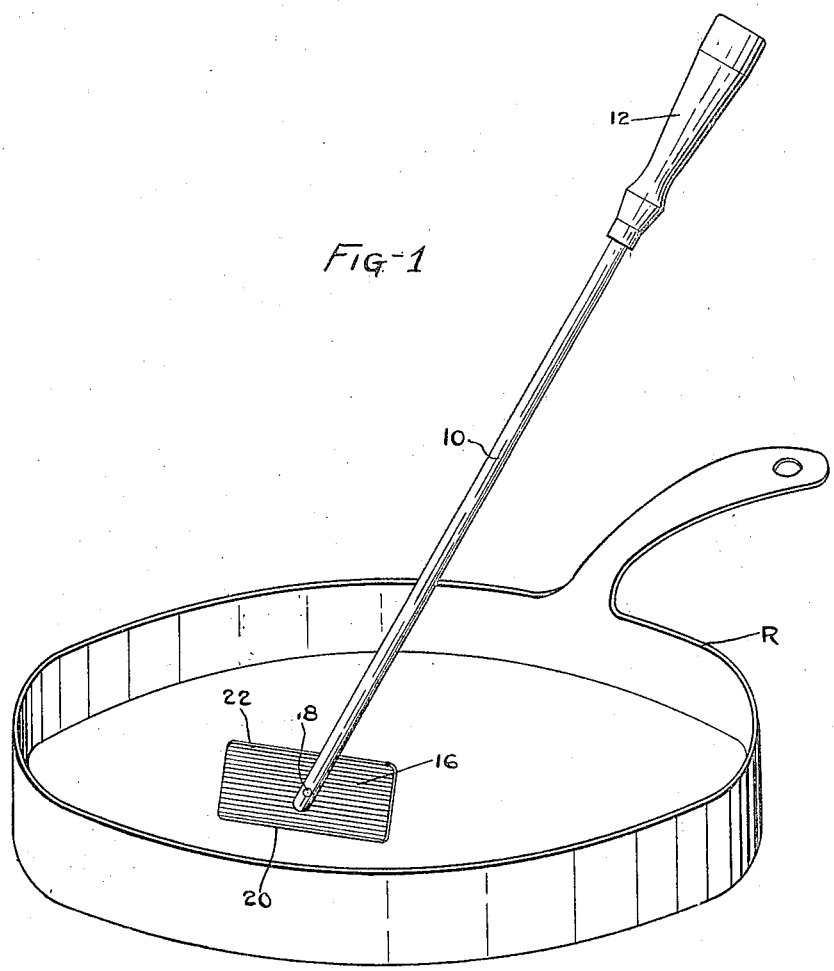
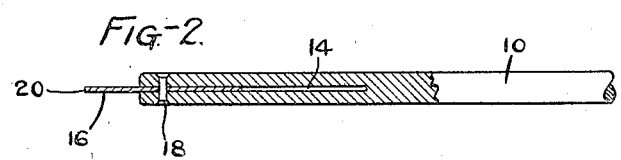
INVENTOR:
CECELIA de LA BARRE.
BY Whiteley and Ruckman
ATTORNEYS Patented Dec. 18, 1923.

1,477,653

UNITED STATES PATENT OFFICE.

CECELIA DE LA BARRE, OF MINNEAPOLIS, MINNESOTA.

CULINARY STIRRING DEVICE.

Application filed January 8, 1923. Serial No. 611,372.

*To all whom it may concern:*

Be it known that I, CECELIA DE LA BARRE, a citizen of the United States, residing at Minneapolis, in the county of Hennepin and State of Minnesota, have invented certain new and useful Improvements in Culinary Stirring Devices, of which the following is a specification.

My invention relates to culinary stirring devices, and an object is to provide a device which may be used for efficiently stirring material such as gravy, sauces, cereal, fudge and preserves while the same is being cooked or heated in a receptacle. Heretofore it has been customary to stir such material with a spoon which has only a limited amount of engagement with the bottom of the receptacle so that it is somewhat difficult to prevent the material burning down. An object in particular therefore of my invention is to provide a device which will have an extended surface for engagement with the bottom of the receptacle and to mount pivotally the member having the extended surface so that it will be maintained for its full extent in engagement with the bottom as the device is moved back and forth or around by the person performing the cooking operation.

The full objects and advantages of my invention will appear in connection with the detailed description, and the novel features of my inventive idea will be particularly pointed out in the claim.

Referring to the accompanying drawings which illustrate one embodiment of my invention, Fig. 1 is a view in perspective showing the device in stirring position in a receptacle. Fig 2 is a fragmentary view showing the stirring end of the device in section.

Referring to the embodiment of the invention shown in the drawings, I provide a handle member which consists of a rod 10 to one end of which is secured a wooden hand engageable portion 12, the other end of the rod is split to form a slot 14, within which a stirring member 16 is pivotally mounted by means of a rivet 18. The stirring member 16 is of generally rectangular shape with rounded corners and the length thereof is considerably greater than the width so as to provide extended edge surfaces 20 and 22 on two of the opposite sides for engagement with the bottom of a receptacle R as shown in Fig. 1. While the stirring member may be pivotally attached in other ways to the handle member, the provision of a slot for receiving the stirring member serves to make a particularly secure attachment.

The operation and advantages of my invention will now be obvious. When the material in the receptacle is stirred, one or the other of the extended edge surfaces 20 and 22 will engage the bottom of the receptacle and as the device is moved by the person during the cooking the extended surface will remain in full engagement with the bottom on account of the pivotal mounting of the member 16. Efficient stirring of the material in the receptacle is thus accomplished and on account of the scraping action of the engaging surface, burning of the material is prevented. It will be understood that the device may be used for other purposes. For instance, the member 16 may be turned so as to be in alinement with the handle member and used for cleaning such articles as milk bottles.

I claim:

A culinary stirring device comprising a handle member having a longitudinal slot in one end thereof, and a rectangular stirring member of sheet material having rounded corners and pivotally attached for free swinging movement in said slot so as to be capable of complete rotation therein, the length of said stirring member being considerably greater than the width thereof.

In testimony whereof I hereunto affix my signature.

CECELIA DE LA BARRE.